Aug. 3, 1971   J. SIROTA   3,597,264
REMOISTENABLE HOT MELT ADHESIVE ARTICLES
Filed Feb. 2, 1970
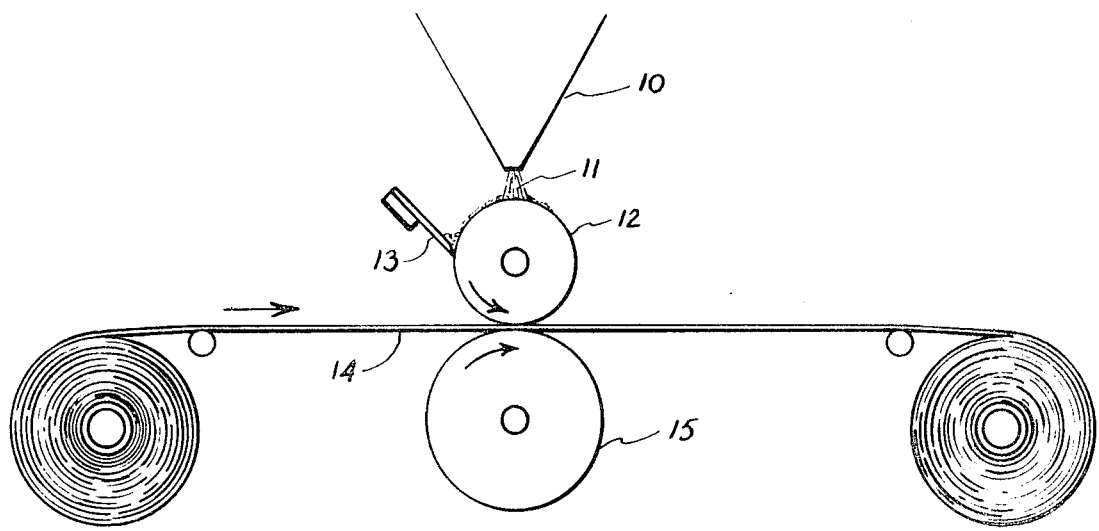
INVENTOR.
JULIUS SIROTA
BY *Thomas A. Graham*
ATTORNEY

United States Patent Office

3,597,264
Patented Aug. 3, 1971

3,597,264
REMOISTENABLE HOT MELT ADHESIVE ARTICLES
Julius Sirota, South Plainfield, N.J., assignor to National Starch and Chemical Corporation, New York, N.Y.
Continuation-in-part of abandoned application Ser. No. 620,709, Mar. 6, 1967. This application Feb. 2, 1970, Ser. No. 7,508
Int. Cl. C09j 7/04
U.S. Cl. 117—122S
3 Claims

ABSTRACT OF THE DISCLOSURE

Flexible web substrates coated on at least one surface, or part thereof, with a remoistenable hot melt adhesive composition containing as the primary ingredient thereof, polyvinyl acetate which has been hydrolyzed by means of an acid hydrolysis technique to the extent that from about 50 to 85% of its original number of acetate groups are converted into hydroxyl groups. Remoistenable hot melt adhesives containing the latter hydrolysis products are ideally suited for use in the manufacture of envelopes, stamps, gummed tapes and wallpaper, etc.

RELATED APPLICATIONS

The application is a continuation-in-part of application Ser. No. 620,709, filed Mar. 6, 1967, and now abandoned, and assigned to the assignee of the subject application.

BACKGROUND OF THE INVENTION

So called remoistenable adhesives are commonly utilized in the production of tapes, labels, wallpaper, posters, envelopes, and similar products. On being moistened with water, substrates which have been coated with such adhesives will become tacky and thereby allow for their ready adhesion to a variety of other materials. In the manufacture of remoistenable adhesive products, it is the usual practice to prepare either an aqueous solution, or dispersion, or an organic solvent solution, or lacquer of the dry adhesive material. After applying a wet film of the adhesive solution or dispersion to a paper substrate, the water or organic solvent is removed and the resulting dry, continuous adhesive film will, on being moistened, produce the desired tacky, adhesive surface.

There are, however, many disadvantages inherent in the use of such aqueous or organic solvent systems to deposit remoistenable adhesive films. Thus, the application of aqueous adhesive systems results in the swelling of the paper fibers and the eventual curling of the substrate. The occurrence of curling is further aggravated upon drying the coated substrate in order to remove the water therefrom. The resulting curled substrates must, therefore, be passed over knife edges in order to destroy the continuity of the adhesive film and thereby allow the substrate to resume its flat configuration. "Blocking" is still another undesirable phenomenon which results from the use of aqueous adhesive systems. Thus, when the adhesive coated substrates are stored and thereby exposed to varying degrees of humidity, the adjacent surfaces of the stacked substrates will often tend to adhere to one another.

Although the use of non-aqueous, organic solvent-based adhesives does not lead to the preparation of coated substrates which are prone to either curling or blocking, there are many hazards inherent in their use. Thus, explosion-proof equipment must be employed and other precautions are required for their safe handling and application. For example, ventilation to eliminate toxic hazards must be provided in order to protect against exposure to the solvent vapors which are encountered when such solvent-based adhesives are applied and supsequently dried.

In an attempt to overcome the deficiencies inherent in the remoistenable adhesives of the prior art, practitioners have resorted to the use of hot melt adhesive systems; the latter being solid, non-volatile compositions which are applied in the molten state and which achieve a solid state and resultant strength upon cooling. Thus, the curling and blocking which result from the use of aqueous systems as well as the toxicity and handling problems which attend the use of non-aqueous systems are eliminated by the use of such hot melt adhesives.

Such prior art remoistenable hot melt adhesives have included partially hydrolyzed polyvinyl acetates which were prepared by means of conventional alkaline hydrolysis techniques whereby the polyvinyl acetate is hydrolyzed in the presence of such alkaline catalysts as sodium hydroxide and sodium alkoxide compounds. Unfortunately, hot melt adhesive formulations based upon the latter alkaline hydrolyzed polyvinyl acetates are often difficult to melt, i.e. they require the application of high temperatures in order to effect their melting, the latter high temperatures thereby producing foamy, heat unstable, high-melt-viscosity liquids. Moreover, when excessively high concentrations of low melting plasticizing agents have been added to such alkaline hydrolyzed polyvinyl acetate hot melt formulations in order to cure the latter deficiency, a marked deterioration in their remoistening and paper tear characteristics has been noted.

SUMMARY OF THE INVENTION

It is, thus, the prime object of this invention to prepare remoistenable hot melt adhesive compositions which are suitable for application to flexible web substrates and which are devoid of the deficiencies inherent in prior art remoistenable adhesive systems.

Thus, it is the object of this invention to provide remoistenable hot melt adhesives characterized by their rapid remoistening, low melt viscosity, good heat and color stability, good block resistance and ease of application. Various other objects and advantages of this invention will become apparent to the practitioner from the following detailed description thereof.

I have now discovered that by utilizing partially hydrolyzed polyvinyl acetate, as hereinafter described, as the primary component of the remoistenable hot melt adhesive compositions of this invention, I have succeeded in eliminating all of the problems heretofore encountered in the use of aqueous organic solvent, and hot melt-based remoistenable adhesive systems including curling, blocking, poor heat stability and high melt viscosity. Thus, the specified partially hydrolyzed polyvinyl acetates exhibit low melt viscosities, excellent heat stability, good block resistance, rapid bond strength and excellent storage stability. When coated onto a suitable substrate and cooled, they yield continuous, consolidated adhesive films which may be moistened with water to form an adhesive surface capable of being securely bonded to other surfaces upon the application of manual pressure. Furthermore, they are readily adaptable to the conventional equipment utilized for the application of hot melt adhesive systems.

DESCRIPTION OF THE PREFERRED EMBODIMENT

The partially hydrolyzed polyvinyl acetates applicable for use in the adhesives of this invention are limited with regard to the molecular weight of the polyvinyl acetate bases utilized in their preparation as well as by the percentage of acetate ester groups which have been hydrolyzed to hydroxyl groups. Thus, expressing molecular weight in terms of intrinsic viscosity, the intrinsic viscosity, as determined in acetone at 30° C., of the applicable polyvinyl acetates should range from about 0.08 to 0.20, although the lower molecular weight polymers, i.e. those whose I.V. ranges from about 0.08 to 0.15, are preferred. The use, in the preparation of the hydrolyzed polyvinyl acetates applicable as the adhesive bases of this invention, of polyvinyl acetates exhibiting intrinsic viscosities in excess of about 0.20 is undesirable since they tend to produce compositions which are highly viscous and difficult to machine. On the other hand, the use of polyvinyl acetates exhibiting intrinsic viscosities falling below about 0.08 is also undesirable since they lead to the preparation of products which are exceedingly soft and hygroscopic and which tend to block and exhibit poor adhesive strength.

It should be noted that it may also be possible to utilize hydrolyzed copolymers of vinyl acetate in the preparation of the adhesives of this invention. Thus, for example, one may employ hydrolyzed copolymers of vinyl acetate with such monomers as the $C_1$–$C_4$ alkyl esters of acrylic and methacrylic acids; it being essential, however, that the resulting copolymers are not substantially plasticized as a result of the presence of the latter comonomers so as to thereby increase the blocking tendencies of the resulting adhesives.

For the purposes of this invention, it is necessary to utilize partially hydrolyzed polyvinyl acetate which has been prepared by means of hydrolysis in the presence of acidic catalysts such as p-toluenesulfonic acid, benzenesulfonic acid, phenolsulfonic acid, xylenesulfonic acid, hydrochloric acid, sulfuric acid, nitric acid and phosphoric acid. Such procedures generally involve refluxing an aqueous dispersion of the polyvinyl acetate in the presence of an acidic catalyst, neutralizing the acidic catalyst present in the system by the addition of stoichiometric quantities of alkaline reagent, steam distilling to remove the water, and thereafter heating the resulting product to dryness. It should be noted that the percent hydrolysis can be readily controlled by simply altering one or more of the process variables utilized in the hydrolysis procedure such, for example, as the reaction time, the concentration of catalyst, or the concentration of water, etc. The hydrolyzed polyvinyl acetates resulting from the latter acid hydrolysis procedure are required for use as the adhesive bases of this invention as they are found to exhibit lighter color, lower melt viscosities, greater heat stability, foam-free melts, and more rapid remoistening properties than those partially hydrolyzed polyvinyl acetates which have been prepared by means of an alkaline hydrolysis technique.

In order to function effectively as remoistenable hot melts, the applicable polyvinyl acetates should be hydrolyzed to the extent that from about 50 to 85% of their original number of acetate groups are converted into hydroxyl groups. Those polymers which have been hydrolyzed to a greater degree, i.e. where more than 85% of the acetate groups have been hydrolyzed, are unsuitable inasmuch as they are excessively viscous, lack heat stability and are difficult to machine. On the other hand, polymers which have been hydrolyzed to a lesser degree, i.e. where less than 50% of their acetate groups have been hydrolyzed, do not exhibit sufficient remoistening ability.

Various optional additives may be added to the hydrolyzed polyvinyl acetates utilized as the bases for the novel remoistening hot melts of this invention in order to modify certain characteristics thereof. Thus, for example, it may be possible to improve their remoistening ability, increase their setting speed, lower their melt viscosity, increase their thermal stability and increase their block resistance by the use of various additives including: fillers, such as clay and chalk; plasticizers, such as polyethylene glycols, water soluble ethoxylated derivatives of urea, tetrahydrofurfuryl alcohol, dibutyl phthalate, polyoxyethylene aryl ether and butyl phthalyl butyl glycolate; antioxidants, such as butylated hydroxyanisole, butylated hydroxytoluene and sodium benzoate; lubricants; waxes; pigments; dyes; and flavoring agents. Since the addition of excessive concentrations of plasticizer is detrimental to the remoistening and block resistance properties of the resulting hot melt compositions, it is necessary to maintain the plasticizer concentration below a level of about 15%, as based on the weight of hydrolyzed polyvinyl acetate. It should be further noted that the use of highly volatile hygroscopic plasticizers, such as propylene glycol and the like, is also highly undesirable. Accordingly, if such plasticizers are used, they should be used with great caution and, of course, in quantities substantially below 15%, based on the weight of the polyvinyl acetate resin.

A variety of methods may be used in order to prepare the remoistenable hot melt compositions of this invention so that they may, thereafter, be applied to the surface of the desired substrate. Thus, the ingredients may merely be combined with one another in a heated pot in the order of their respective melting points. Or, they may be prepared in solution form with the solvents being removed prior to their application. Calendering rolls and extruders may also be used, it being essential in all of these methods that the ingredients are thoroughly blended and available for rapid transfer to the intended substrate. In most instances, the resulting remoistenable hot melt adhesive compositions are applied to the selected substrate at temperatures ranging from about 250 to 375° F.; the melt viscosities at these temperatures ranging from about 2000 to 25000 cps. Although paper is the usual flexible web substrate to which these adhesives will be applied, paperboard, synthetic polymeric films and textiles may also be efficiently utilized.

Any of the conventional hot melt coating methods can be utilized to deposit the adhesive compositions of this invention. Examples of available techniques include knife coating, roller coating, spraying and dipping, etc. The coating thickness at which these adhesives are applied will, of course, vary according to the particular adhesive formulation, although practical coating thicknesses range from about 0.5 to 2.0 mils. Upon cooling, the molten adhesive will set to a solid state. The resulting continuous dry films are characterized by their smoothness and lack of tackiness and, upon the application of water, by their quick remoistenability, their tackiness and their excellent bonding strength.

In the drawing I have illustrated diagrammatically the application of the material by means of rollers, wherein 10 is a pot of molten hot melt composition 11, flowed onto roller 12, controlled by doctor blade 13 and applied to substrate 14 which is pulled over pressure roll 15.

In the following examples, which further illustrate the embodiment of this invention, all parts given are by weight unless otherwise specified.

Example I

This example illustrates a typical acid hydrolysis procedure for preparing the partially hydrolyzed polyvinyl acetates applicable for use in the preparation of the novel adhesives of this invention.

The following ingredients were introduced into a vessel equipped with means for mechanical agitation.

|  | Parts |
|---|---|
| Polyvinyl acetate (I.V. of 0.11, as determined in acetone at 30° C.) | 5280 |
| Water | 4320 |
| p-Toluenesulfonic acid | 140 |

Under agitation, the above ingredients were refluxed at a temperature of 212° F. for a period of 3.5 hours at which time a clear solution resulted. The latter solution was then refluxed for an additional 1.5 hours. The catalyst was neutralized by the addition of 31.8 parts of sodium hydroxide and the resulting product was then steam distilled for about 12 hours while the internal temperature of the system was raised to 250° F. This distillation procedure removed the water and free acetic acid present in the system. On subsequently raising the temperature to 315° F. for a period of 15 minutes, it was possible to draw off the partially hydrolyzed polyvinyl acetate in molten form.

On analyzing a sample of the resulting product, it was determined that 84% of the acetate groups in the polyvinyl acetate had been hydrolyzed to hydroxyl groups.

Example II

This example illustrates the excellent properties exhibited by the adhesives derived from a variety of partially hydrolyzed polyvinyl acetates. It further illustrates the advisability of utilizing partially hydrolyzed polyvinyl acetates which have been hydrolyzed to the extent of from about 50 to 85% of their available acetate groups.

Utilizing the general procedure set forth in Example I, hereinabove, partially hydrolyzed polyvinyl acetates were prepared exhibiting varying degrees of hydrolysis. The resulting partially hydrolyzed polyvinyl acetates were then evaluated by means of the following procedures:

Melt viscosity.—A 50 gram sample of the specified partially hydrolyzed polyvinyl acetate was heated in an oil bath at a temperature of 350° F. Upon reaching equilibrium, the viscosity of the resulting molten product was determined on a Brookfield Viscometer (Model RVF) using a #6 spindle at the highest permissible spindle speed.

Heat stability.—The molten samples resulting from the above described "Melt Viscosity" determination, were placed in an oven set at a temperature of 350° F. and retained therein for a period of 24 hours. Observations were then made as to changes in color in order to determine the extent of degradation exhibited by the holt melt.

Remoistenability.—A series of films having a wet thickness of 1.0 mil were cast on envelope paper stock from partially hydrolyzed polyvinyl acetate samples which had been heated at a temperature of 350° F. in order to put them in molten form. The dry films were then remoistened with water and adhered, by means of manual pressure, to uncoated paper stock. After a period of 30 seconds, the resulting bonded substates were delaminated and examined for the purpose of determining the degree of fiber tear relative to the total area of the adhesive coating, the result then being expressed as "present tear."

Weter solubility.—This property was determined by admixing four grams of the partially hydrolyzed polyvinyl acetate sample with 100 grams of water, boiling the resulting dispersion for a period of 60 minutes and thereafter aging it for an additional 20 hours. Acceptable solubility properties were indicated by the resulting appearance of clear or relatively clear solutions which were free of insolubles.

The results of the various tests are described in the following table:

The data summarized above thus serve to illustrate both the excellent remoistening and hot melt properties of the partially hydrolyzed polyvinyl acetate adhesive bases of this invention. The data further serve to illustrate the necessity for using polyvinyl acetates which have been partially hydrolyzed to the extent of from about 40 to 85% of their original number of acetate groups. Thus, the adhesives derived from polymers exceeding the latter hydrolyses range tend to be excessively viscous, heat unstable and difficult to machine, while those adhesives derived from polymers hydrolyzed to a lesser degree exhibit poor remoistening and solubility properties.

Example III

This example illustrates the necessity for utilizing polyvinyl acetates which have been partially hydrolyzed by means of an acidic hydrolysis procedure in order to prepare satisfactory remoistenable hot melt adhesive compositions.

Thus, 100 gram samples of (1) a 75% acid hydrolyzed polyvinyl acetate which had been prepared by means of the procedure set forth in Example I, hereinabove; (2) a 75% alkaline hydrolyzed polyvinyl acetate which had been prepared by means of an alcoholysis technique utilizing a methanol solvent and a sodium hydroxide catalyst; and, (3) a 72–77.5% hydrolyzed polyvinyl acetate which had been prepared by means of an alkaline hydrolysis procedure and which is available under the trade name "Gelvatol 40–10" as supplied by the Shawinigan Resins Corp., were subjected to the "Melt Viscosity" and "Heat Stability" determinations as set forth in Example II, hereinabove, with the following results:

| Sample Number | Melt viscosity (cps. at 350° F.) | Initial appearance of melt | Heat stability |
| --- | --- | --- | --- |
| 1 | 13,000 | Clear, smooth fluid | Smooth, slightly darkened fluid. |
| 2 | 60,000 | Foamy fluid | Black, gummy, slightly foamed mass. |
| 3 | 75,000 | do | Do. |

The data summarized above clearly indicate the nceessity for utilizing only acid hydrolyzed polyvinyl acetates in order to provide remoistenable hot melt adhesive compositions which are characterized by such properties as low melt viscosity, and excellent heat stability.

Example IV

This example further illustrates the excellent properties exhibited by a variety of remoistenable hot melt adhesive compositions typical of this invention.

The acid hydrolyzed polyvinyl acetates described in the following table were prepared by means of the procedure set forth in Example I, hereinabove. The various modifying agents were thereafter admixed with these poly-

| Percent hydrolysis of polymer sample | Melt viscosity (cps. at 350° F.) | Heat stability | Remoistenability | Water solubility |
| --- | --- | --- | --- | --- |
| 10 | 1,300 | No color change | 0% tear | Total insolubility. |
| 47 | 3,000 | do | do | Partial insolubility |
| 50 | 3,750 | do | 10% tear | Almost complete solubility. |
| 59 | 4,250 | do | 50% tear | Do. |
| 67 | 7,900 | do | 100% tear | Total solubility. |
| 75 | 13,000 | Slight darkening | do | Do. |
| 84 | 22,500 | do | do | Do. |
| 85 | 25,000 | Moderate darkening. | 100% tear (slight difficulty in coating). | Do. |
| 87 | 30,000 | Moderate heavy darkening. | Too viscous to be effectively coated. | Do. | vinyl acetates and maintained, under agitation, at a temperature of 350° F. for a period of two hours, i.e. the time required in order to prepare uniform blends.

| Formulation Number | Parts | | | | | | | |
|---|---|---|---|---|---|---|---|---|
| | 1 | 2 | 3 | 4 | 5 | 6 | 7 | 8 |
| 50% acid hydrolyzed polyvinyl acetate | 100 | | | | | | | |
| 59% acid hydrolyzed polyvinyl acetate | | 95 | | | | | | |
| 67% acid hydrolyzed polyvinyl acetate | | | 90 | | | | | |
| 75% acid hydrolyzed polyvinyl acetate | | | | 85 | | | 85 | 85 |
| 84% acid hydrolyzed polyvinyl acetate | | | | | 88 | | | |
| 85% acid hydrolyzed polyvinyl acetate | | | | | | 87.5 | | |
| Polyethylene glycol | | | 5 | 12 | 12.0 | | | |
| Sodium benzoate | | | | | | 0.5 | | |
| Precipitated chalk | | | 5 | 5 | 5 | | 5 | 5 |
| Glyceryl monostearate | | | | 5 | 5 | | 5 | 5 |
| Dibutyl phthalate | | | | | | | 3 | |
| Butyl phthalyl butyl glycollate | | | | | | | | 2 |

Each of the above prepared molten compositions was heated to a temperature of 350° F. and thereafter coated, in one mil thicknesses, on envelope paper stock by means of a heated rod technique.

The coated samples were then aged for a period of 48 hours at a relative humidity of 70%. Neither curling nor blocking was observed in any of the aged samples. Furthermore, all of the samples remoistened rapidly and exhibited tearing bonds within a period of 30 seconds upon being subjected to the "Remoistenability" determination described in Example II, hereinabove.

Summarizing, it is thus seen that this invention provides for the preparation of novel remoistening hot melt adhesive compositions which are characterized by their low melt viscosity, their heat stability, and their excellent remoistening and bonding properties.

Variations may be made in procedures, proportions, and materials without departing from the scope of this invention which is defined by the following claims.

What is claimed is:

1. A water remoistenable adhesive coated substrate comprising a flexible web coated on at least a portion of one surface thereof with an adhesive film comprising the dry residue of a remoistenable hot melt composition, said remoistenable hot melt composition comprising (a) polyvinyl acetate which has been hydrolyzed by means of an acid catalyzed hydrolysis procedure to the extent that from about 50 to 85% of its original number of acetate groups are converted into hydroxyl groups, wherein said acid catalyzed hydrolysis procedure comprises the steps of:
   (1) heating an aqueous dispersion of said polyvinyl acetate at the reflux temperature of said dispersion in the presence of an acidic catalyst;
   (2) neutralizing the acidic catalyst present therein by the addition of stoichiometric quantities of an alkaline reagent;
   (3) steam distilling the neutralized solution; and
   (4) heating the resulting partially hydrolyzed polyvinyl acetate to dryness;
and (b) from 0 to 15% of a plasticizer, based on the weight of said hydrolyzed polyvinyl acetate.

2. The adhesive coated substrate of claim 1, wherein said partially hydrolyzed polyvinyl acetate has been derived from a polyvinyl acetate polymer having an intrinsic viscosity, as determined in acetone at 30° C., of from about 0.08 to 0.20.

3. The adhesive coated substrate of claim 1, wherein said remoistenable hot melt adhesive composition has a melt viscosity, at a temperature range of from about 250 to 375° F., or from about 2000 to 25,000 cps.

References Cited

UNITED STATES PATENTS 2,850,468   9/1958   Giggey _____ 117—155X
3,143,518   8/1964   Smith et al. _____ 117—122X

OTHER REFERENCES

Wakeman, R. L.: The Chemistry of Commercial Plastices, 1947, pp. 363 to 375.

WILLIAM D. MARTIN, Primary Examiner

H. J. GWINNELL, Assistan Examiner

U.S. Cl. X.R.

117—138.8R, 155UA, 165UC